Jan. 1, 1952   A. WOLF   2,580,636
REFLECTION SEISMIC EXPLORATION
Filed March 1, 1945   2 SHEETS—SHEET 1
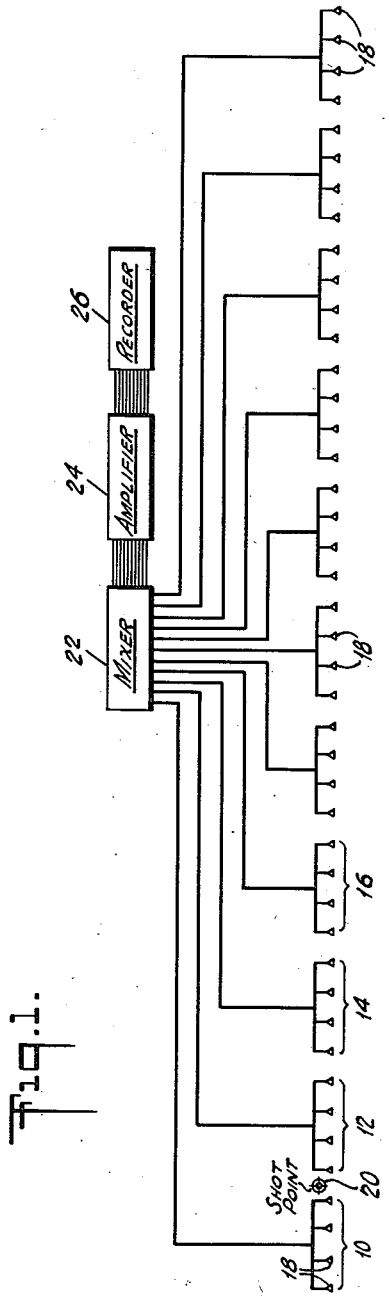
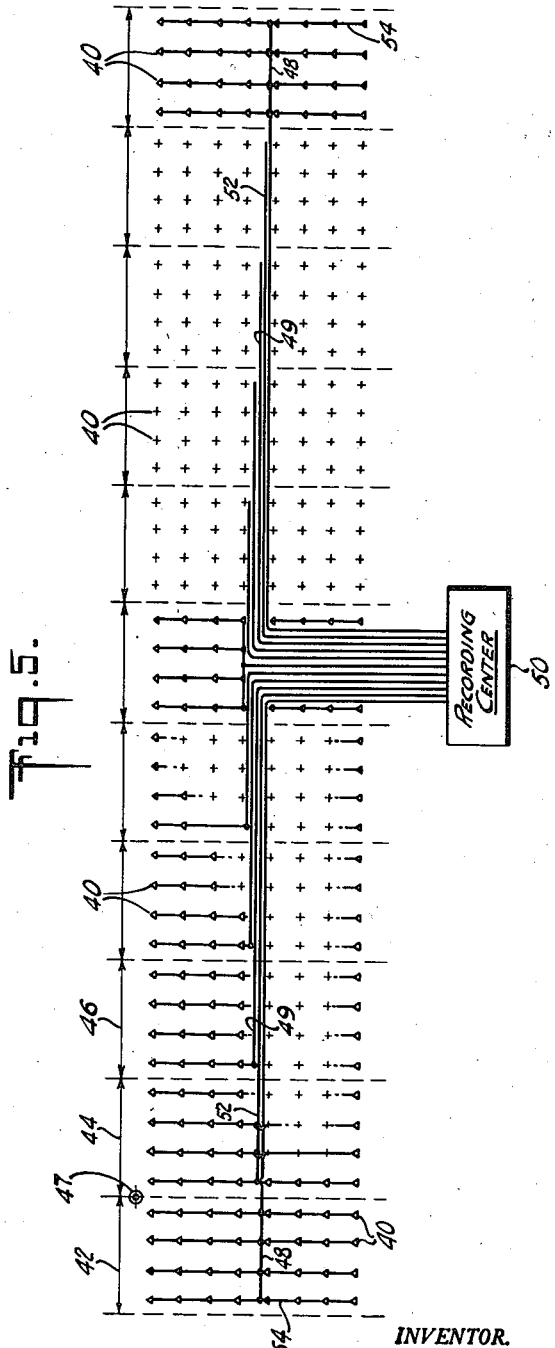
INVENTOR.
ALEXANDER WOLF.
BY
ATTORNEY.

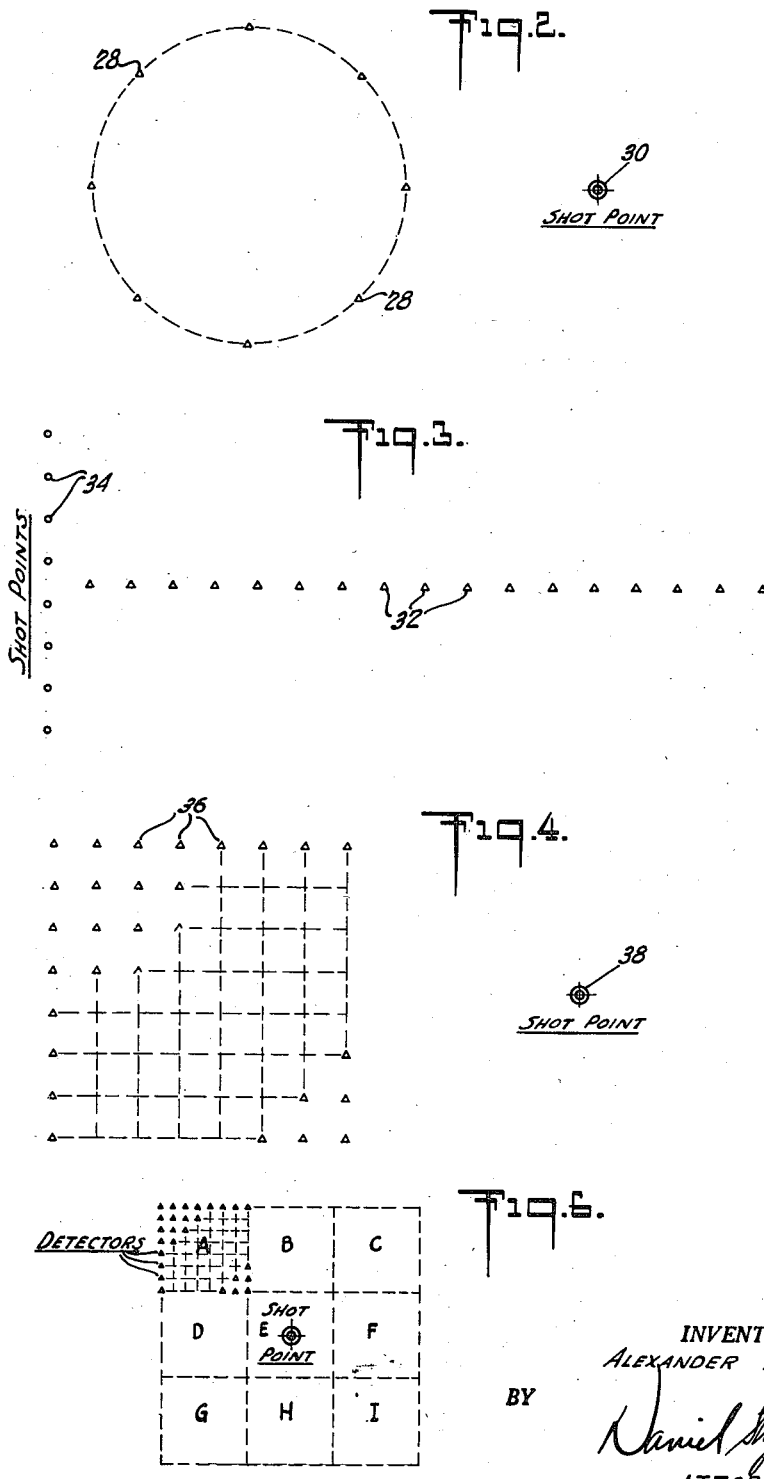

Patented Jan. 1, 1952

2,580,636

UNITED STATES PATENT OFFICE 2,580,636

REFLECTION SEISMIC EXPLORATION

Alexander Wolf, Houston, Tex., assignor to The Texas Company, New York, N. Y., a corporation of Delaware Application March 1, 1945, Serial No. 580,371

4 Claims. (Cl. 181—0.5)

My invention relates to seismic exploration and more particularly to a method and an arrangement whereby good seismic records may be obtained in areas where it has generally been impossible to obtain usable records heretofore due to various causes, for example, due to the occurrence at or near the surface of a bed or hard formation of limestone, caliche or the like.

I have discovered by experiments that in addition to waves which arrive from the direction of the shot point and to waves reflected toward the surface from bedding planes, there exist also waves which arrive at the detectors in a substantially horizontal plane but not from the direction of the shot point. These last mentioned waves are very troublesome and where they are present they usually render the record so confusing as to be unintelligible.

There is general agreement on the fact that the difficulty arises from vibrations of the hard surface formation, which are set up by the shot, these vibrations usually persisting so long that the reflections from the various bedding planes cannot be seen on the records. I have pointed out that these persistent vibrations could not be maintained without the presence of discontinuities in the surface formation from which discontinuities the vibrations must be reflected. Depending upon the nature and the position of these discontinuities the surface vibrations will arrive at the detecting instruments from all possible directions in the horizontal plane.

One very common arrangement of the vibration detecting instruments is not well suited for the suppression of these waves. This arrangement, which is well known, comprises a large number of detectors disposed in a straight line and a shot point located more or less on the detector line. The detectors are usually connected in groups of perhaps four and the output of each such group is "mixed" with the output of the adjoining group so that every trace on the record or seismogram represents an algebraic summation of perhaps eight detectors located on a line passing more or less through the shot point. This arrangement of detectors is selected with the view of suppressing any wave travelling horizontally from the shot point toward the instruments and it is not suited for the suppression of waves arriving at the instruments from any other direction.

One arrangement which I have suggested for overcoming the difficulties due to these vibrations in the surface formation consists of a detector array in which each group of detectors comprises a plurality of, say, eight elements spaced on the circumference of a circle approximately 100 ft. in diameter or at least as large in diameter as the wave length of the interfering vibrations. The justification of this arrangement lies in the fact that such a circular group should possess equally reduced sensitivity in all horizontal directions. One disadvantage of this arrangement lies in the fact that it is often difficult, if not impossible, to set up the detectors in a circle because of the nature of the terrain, the existence of obstructions on the surface, etc.

Another arrangement designed to overcome the aforementioned difficulties consists in replacing the additional detectors by additional shot points. To be more specific, a commonly used detector array would be used, that is, 13 groups of four detectors each along a straight line and a plurality of, say, eight shot points approximately 50 feet apart in a straight line at right angles to the line of the detectors. The reason for this arrangement resides in the fact that such a shot point array would cause comparatively weak waves to be sent through the surface formation in the direction at right angles to the instrument line, which is the direction in which the multiple connection of the detectors does not reduce sensitivity. An arrangement of this type has been tested in the field and a marked improvement was obtained when using the eight shot points as compared with the results from a single shot point.

In accordance with the invention, which will be described more fully hereinafter, the detectors are placed not on a straight line but over an area having a minimum width of approximately one wave length of the interfering waves. In any event, the smallest dimension of the area should be at least 100 ft. and in some locations 200 or 300 ft. or even more. This is accomplished by employing a large group of detectors disposed in parallel lines, each line containing a number of detectors separated by a predetermined distance and the lines also being separated by the same distance. Several groups of this kind are arranged adjacent to each other so that the area covered by all of the groups will be in the form of an elongated rectangle or ribbon. All of the detectors in one group will be connected together and the outputs of each two adjacent groups will be "mixed" so that each trace on the seismogram will represent an algebraic summation of a large number of detectors, perhaps 30 to 100, spaced more or less uniformly over an area the least dimension of which is at least of the order of a wave length of the interfering vibration. An objection to such an arrangement lies mainly in the fact that the total number of detectors employed on one array is multiplied by a factor of perhaps six, or eight, or even more which means that in the place of 52 detectors arranged in 13 groups of 4 each in a straight line, one would need 416 detectors. However, this objection is not insurmountable and it has been proven that with the arrangement described good records can be obtained in areas in which it was not possible previously to secure any usable records.

For a better understanding of the invention reference may be had to the accompanying drawing in which Fig. 1 is a somewhat diagrammatic plan view showing a common arrangement of detectors extending substantially in a line with the shot point;

Fig. 2 is a view showing an arrangement of one group of detectors placed in a circle;

Fig. 3 is a view showing a plurality of shot points placed in a line at right angles to a line of detectors;

Fig. 4 is a view showing one group of detectors arranged in eight parallel lines, each line containing eight detectors;

Fig. 5 is a view showing a plurality of groups of detectors disposed in the form of a ribbon; and Fig. 6 is a diagrammatic view of another modification showing several of the groups of Fig. 4 arranged to cover a square area.

A common arrangement of detectors and shot points is shown in Figure 1 wherein a plurality of groups 10, 12, 14, 16, etc., of seismic detectors 18 are disposed along a substantially straight line, a shot point 20 being located usually near the end of the line and either directly on the line of detectors or slightly offset therefrom. There are four detectors connected together electrically in each group and a cable is then led from each group to a suitable mixing device 22 the output of which passes to an amplifier 24. A recorder 26 which may comprise a multi-string recording galvanometer receives the output from amplifier 24 and each string of the galvanometer provides a trace indicative of the algebraic sum of the outputs of each two adjacent groups, as is well known. With this arrangement of detectors it has been found, as has been pointed out in preceding paragraphs, that where the area being shot is covered with a layer of a hard formation the vibrations pass backwards and forwards in all directions in the horizontal plane containing the detectors, and since these vibrations persist over a considerable length of time the desired reflected vibrations from the subsurface formations are sometimes totally obscured.

In Figure 2 is disclosed an arrangement wherein a plurality of detectors 28, eight in this instance, is arranged in a circle, the detectors being connected together so that the sum of their outputs is recorded in a galvanometer trace. The shot point 30 may be disposed at substantially any desired location with respect to the circle of detectors. With such an arrangement the circular group should possess equally reduced sensitivity in all horizontal directions to vibrations passing in those directions. In actual practice a plurality of the circle groups would be arranged substantially linearly to cover an elongated area. I have found by experiment that while possessing a certain degree of effectiveness, this arrangement is not as good as those which will be described in following paragraphs.

In Figure 3 is shown an arrangement of detectors 32 disposed in a straight line and connected with a recorder as described with reference to Figure 1, and a group of shot points 34 also arranged in a line, the line of the shot points being at right angles to the line of detectors. The distance between the detectors should be about the same as the distance between shot points, for example, 50 feet. An arrangement of this type has been tested experimentally and found to be more effective than the arrangement disclosed in Figure 2 since with the plurality of simultaneous shots, comparatively weak waves are sent in the direction at right angles to the instrument line.

In Figure 4 is shown a multiplicity of detectors 36 arranged in parallel lines, eight in this instance, the lines being separated by, say, 50 feet and eight detectors in each line also being separated from each other by the same distance. A shot point 38 is disposed in the middle or at one side or at any other desired position with respect to the group of detectors. All of the detectors of the group shown in Figure 4 are connected together electrically and the combined output of the group is amplified and recorded in the galvanometer trace. The minimum dimension of the area covered by the detectors is at least 100 feet or at least as large as one wave length of the interfering vibrations. It has been found that with such an array of detectors the troublesome vibrations passing back and forth in all directions in the horizontal layer are substantially eliminated in the resulting record while the reflections from the subsurface strata are clearly discernible.

The arrangements shown in Figures 2 and 4 each provide for but one group of detectors and it is of course desirable to cover an area longer than the width of one group. In Figure 5 is illustrated a plurality of detector groups or rather "half-groups" arranged more or less uniformly over the surface of the ground in the general form of an elongated rectangle or ribbon. The detectors 40 in each half-group 42, 44, 46, etc., are separated about 50 ft. apart in four parallel lines each containing eight detectors. The shot point 47 is disposed as convenient near one end of the ribbon either within the area covered by the detectors or at one side. The detectors in a half-group such as 42 are all connected to one section 48 of a multi-conductor cable 49 which extends preferably from each end of the rectangle to the center and is then connected to suitable recording means indicated diagrammatically as a "recording center" 50. The detectors in half-group 44 are connected to another section 52 of the cable 49 and so on so that the output of each half-group is led to the recording center 50. The recording center 50 includes a suitable mixer as shown in Figure 1 so that the outputs of each adjacent pair of half-groups such as 42 and 44 are mixed and recorded in a single trace of the recording mechanism also included in the recording center 50. With the arrangement of the cable 49 which has been shown a minimum amount of cable is required. In actual practice the eight detectors in one line of a group are connected together by means of a two conductor cable such as is indicated diagrammatically at 54 and a point more or less at the center of this cable is then connected to a section such as 48, of the main cable 49. It is to be understood that each of the cable sections 48, 52, etc. actually includes two conductors.

As has been stated hereinbefore the diameter of the circle shown in Figure 2 and the width of the square of detectors of Figure 4 should be at least equal to one wave length of the vibrations it is desired to suppress and in any event these dimensions should be at least 100 feet and in many instances it will be found that they should be greater. With reference to Figure 5 the width of each half-group such as 42 should be at least half a wave length or at least 50 feet in order that the unwanted horizontal vibrations will be eliminated from the record.

If desired, instead of dividing the groups of 64 detectors (Fig. 4) into half-groups as shown in Figure 5, the array can comprise a plurality of full groups arranged adjacent each other to cover the area of the rectangle. In this case "mixing" may also be employed whereby the algebraic sum of the outputs of each two adjacent groups will be recorded in one galvanometer trace.

In Figure 6 is shown another modification in which a plurality, nine in this instance, of the detector groups, one of which is shown in Figure 4, are arranged to cover a large square area. It is not essential that the area covered be square as any other shape such as a circle may be used. These groups are indicated as A, B, C . . . I and in the example shown each group contains 64 detectors disposed in eight parallel lines, eight detectors in each line and the detectors being separated from each other each way by about 50 feet. It is not essential that each group be in the form of a square but it is necessary that the minimum dimension of the area covered by each group be at least one half wave length of the vibrations to be suppressed and not less than 50 feet.

With the arrangement shown in Figure 6, it is preferred that the detectors of each group be connected together so that their combined output is recorded. The groups can be connected electrically to the recorder in various ways, for example, each group can be connected to a separate string of a multi-string galvanometer and thus, in the example shown, nine traces will be made. Again, the outputs of the groups can be mixed in various combinations. For instance, groups A, B, D and E can be made to actuate one galvanometer element; groups B, C, E and F another element; groups D, E, G and H another element and groups E, F, H and I still another element. It may be found desirable to connect all of the groups in parallel to a single galvanometer element so that the recorded trace will represent the sum of the entire number of detectors. Other ways of mixing the output of the groups in different combinations may also be found effective.

In its broad aspect the invention consists in having every galvanometer element actuated by a large number of detectors located in a substantially uniform fashion over an area the least dimension of which is not less than one wave length of the interfering waves, whereby a partial cancellation of those waves is effected.

Obviously many modifications and variations of the invention as hereinbefore set forth may be made without departing from the spirit and the scope thereof but only such limitations should be imposed as are indicated in the appended claims.

I claim:

1. A reflection method of seismic exploration which comprises exploding a charge to generate vibrations at a point at or near the earth's surface and actuating a recording galvanometer by the sum of adjacent pairs of groups of detectors set up on or near the surface of the earth and each of said groups substantially uniformly covering an area the least dimension of which is not less than about one wavelength of any interfering vibrations traveling in the plane containing said detectors.

2. In a system of reflection seismic exploration in which compressional waves are generated by an explosion at a point at or near the earth's surface, a multiplicity of seismic wave detectors spaced substantially uniformly over an area having generally the shape of an elongated rectangle, said detectors being divided into adjacent groups and each group covering an area the smallest dimension of which is not less than 50 feet and preferably at least as great as one half the wave-length of interfering waves moving in the plane containing said detectors, and means comprising a multi-string galvanometer for recording waves reflected to said areas from subsurface boundaries, each string of said galvanometer being connected to record the output of the sum of the detectors in an adjacent pair of said groups.

3. In a system of reflection seismic exploration in which compressional waves are generated by an explosion at a point at or near the earth's surface, a multiplicity of seismic wave detectors spaced substantially uniformly over an area having generally the shape of an elongated rectangle, said detectors being divided into adjoining groups and each group covering an area the smallest dimension of which is at least as great as the wave-length of interfering waves traveling in the plane of said rectangle, the detectors in each group being connected electrically in parallel, and means for recording the outputs of each pair of adjoining detector groups, said last named means including a recording galvanometer disposed near the mid-point of said rectangle, a main cable having a plurality of conductor sections extending from said galvanometer to the ends of said rectangle and cables extending laterally from each of said main cable sections and connected to the detectors in lateral lines of each group.

4. The method of reflection seismic exploration which comprises disposing a multiplicity of seismic wave detectors over an area of the earth's surface, said area being in the shape of an elongated rectangle divided laterally into a plurality of adjoining zones, the smallest dimension of each zone being at least as great as one-half the wave length of any interfering waves and not less than fifty feet, and said detectors being spaced from each other throughout said area by uniform distances, exploding a charge to generate compressional waves at a point at or near the earth's surface and separately recording the sums of the waves reflected from subsurface boundaries to each of said adjoining zones.

ALEXANDER WOLF.

REFERENCES CITED

The following references are of record in the file of this patent:

UNITED STATES PATENTS

| Number | Name | Date |
| --- | --- | --- |
| 1,799,398 | Taylor | Apr. 7, 1931 |
| 2,117,365 | Salvatori et al. | May 17, 1938 |
| 2,151,878 | Weatherby | Mar. 28, 1939 |
| 2,156,198 | Scherbatekog | Apr. 25, 1939 |
| 2,156,624 | Faust | May 2, 1939 |
| 2,167,124 | Minter | July 25, 1939 |
| 2,184,313 | Owen | Dec. 26, 1939 |
| 2,191,121 | Slichter | Feb. 20, 1940 |
| 2,192,972 | Innes | Mar. 12, 1940 |
| 2,202,885 | Zuschlag | June 4, 1940 |
| 2,232,612 | Klipsch | Feb. 18, 1941 |
| 2,321,450 | Athy et al. | June 8, 1943 |
| 2,431,600 | Wolf | Nov. 25, 1947 |